(12) United States Patent
Mantri et al.

(10) Patent No.: US 11,405,769 B2
(45) Date of Patent: Aug. 2, 2022

(54) SYSTEMS AND METHODS FOR OBTAINING INFORMATION ASSOCIATED WITH A PRODUCT USING SHORT RANGE WIRELESS COMMUNICATION

(71) Applicant: Verizon Patent and Licensing Inc., Basking Ridge, NJ (US)

(72) Inventors: Viraj Chandrakant Mantri, Mumbai (IN); Srividhya Parthasarathy, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 202 days.

(21) Appl. No.: 16/922,720

(22) Filed: Jul. 7, 2020

(65) Prior Publication Data

US 2022/0014897 A1   Jan. 13, 2022

(51) Int. Cl.
*H04B 7/00* (2006.01)
*H04W 8/00* (2009.01)
*G06Q 30/06* (2012.01)
*H04W 4/80* (2018.01)
*H04W 76/14* (2018.01)

(52) U.S. Cl.
CPC ........ *H04W 8/005* (2013.01); *G06Q 30/0643* (2013.01); *H04W 4/80* (2018.02); *H04W 76/14* (2018.02)

(58) Field of Classification Search
CPC ....... H04W 8/005; H04W 4/80; H04W 76/14; G06Q 30/0643
USPC ....................................................... 455/41.2
See application file for complete search history.

(56) References Cited

U.S. PATENT DOCUMENTS

| | | | |
|---|---|---|---|
| 6,837,427 B2 * | 1/2005 | Overhultz | G06Q 10/02 235/382 |
| 9,629,113 B2 * | 4/2017 | Ren | H04W 4/80 |
| 10,743,683 B2 * | 8/2020 | Deng | G01C 3/12 |
| 11,017,434 B2 * | 5/2021 | Garcia Galvao Almeida | G06Q 30/0201 |
| 11,206,505 B2 * | 12/2021 | Hare | G06F 3/011 |
| 11,270,348 B2 * | 3/2022 | Walden | G06F 16/24 |
| 2007/0285385 A1 * | 12/2007 | Albert | G09G 3/38 345/107 |
| 2018/0109928 A1 * | 4/2018 | Walden | H04B 17/27 |
| 2018/0374127 A1 * | 12/2018 | Walden | G06F 16/24 |

(Continued)

*Primary Examiner* — April G Gonzales

(57) ABSTRACT

A device may cause a short range wireless communication component to scan for threshold signals. The device may receive a plurality of threshold signals associated with short range wireless communication devices, the short range wireless communication devices being associated with a plurality of products. The device may determine received signal strength indicators (RSSIs) of the plurality of threshold signals; and may identify, based on the RSSIs, a short range wireless communication device, of the short range wireless communication devices, that is nearest the device. The device may establish a short range wireless communication connection with the short range wireless communication device, the short range wireless communication device being associated with a product. The device may obtain, via the short range wireless communication connection, product information associated with the product; and may perform an action associated with rendering the product information on a display of the device.

20 Claims, 8 Drawing Sheets

(56) References Cited

U.S. PATENT DOCUMENTS

| | | | |
|---|---|---|---|
| 2022/0014897 A1* | 1/2022 | Mantri | H04W 8/005 |
| 2022/0071606 A1* | 3/2022 | Aljuri | G01N 1/00 |

* cited by examiner

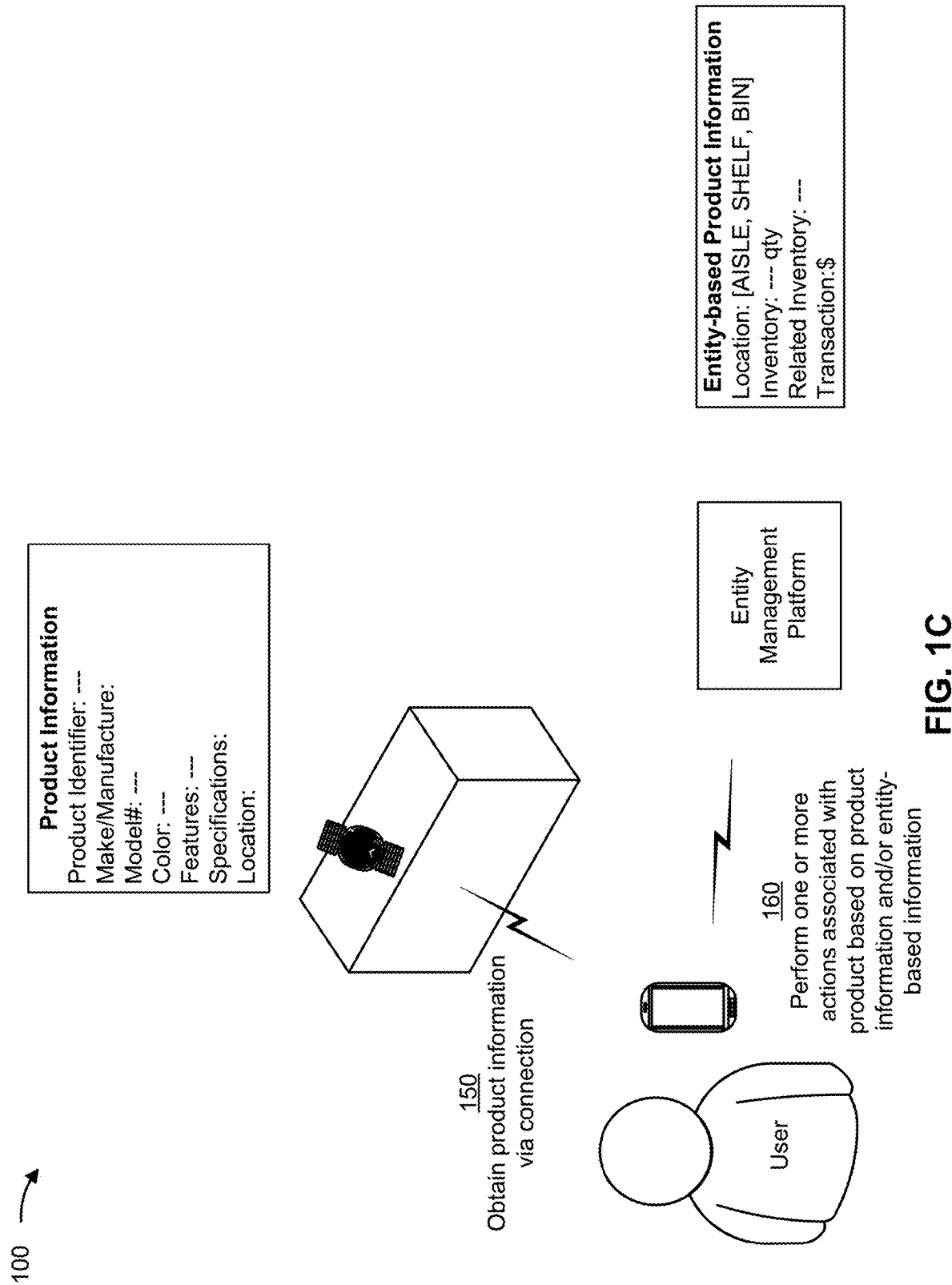

SYSTEMS AND METHODS FOR OBTAINING INFORMATION ASSOCIATED WITH A PRODUCT USING SHORT RANGE WIRELESS COMMUNICATION

BACKGROUND

Extended reality (XR), such as augmented reality (AR), virtual reality (VR), mixed reality (MR), and/or the like, may refer to computer technologies that use software to integrate real and virtual elements and/or audio to create an immersive experience. For example, AR generally refers to interactive technologies in which objects in a real-world environment are augmented using computer-generated virtual content that may be overlaid on the real-world environment. An individual may wish to use a user device to launch an AR experience on a network.

BRIEF DESCRIPTION OF THE DRAWINGS

FIGS. 1A-1E are diagrams of an example implementation described herein.

DETAILED DESCRIPTION OF PREFERRED EMBODIMENTS

Figure 1A:
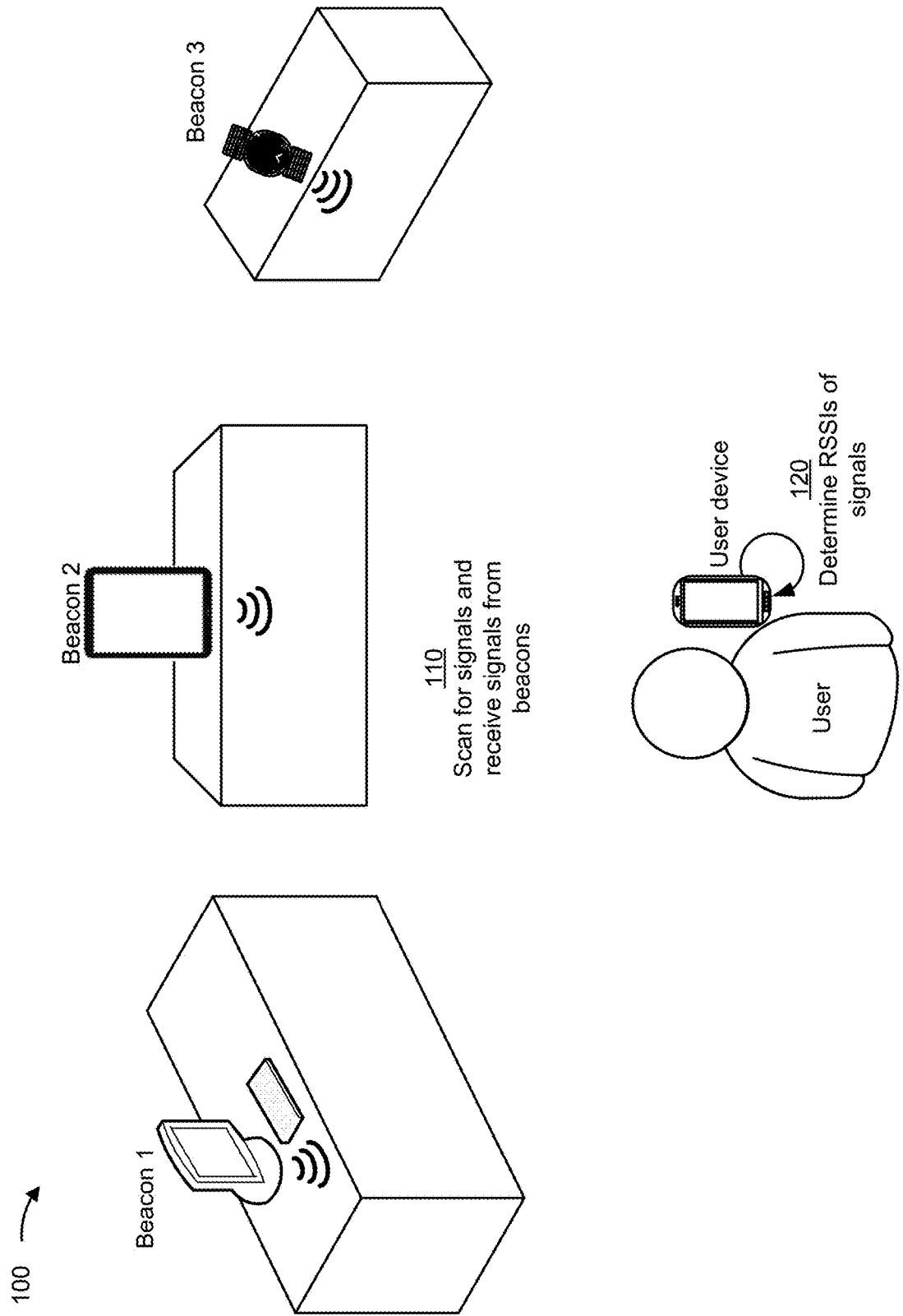

The following detailed description of example implementations refers to the accompanying drawings. The same reference numbers in different drawings may identify the same or similar elements.

Augmented reality (AR) generally refers to interactive technologies in which objects in a real-world environment are augmented using computer-generated virtual content that may be overlaid on the real-world environment. AR systems (and other XR systems) typically use image processing techniques to identify an object and correspondingly render information associated with the object. The image processing techniques may include a computer vision technique, an object detection technique, an image segmentation technique, an object in motion technique, an optical character recognition (OCR) technique, and/or the like. Such image processing techniques may consume a considerable amount of computing resources, network resources, and/or the like.

An enterprise may desire to use AR to enhance a customer experience at a store. For example, the customer may desire to use a user device, associated with a network, to launch an AR experience regarding products and/or services being offered for sale at the store. The AR experience may enable the customer to obtain information and content regarding the products and/or services offered for sale. Such information may assist the customer in making a decision and conducting a transaction at the store. In some instances, launching the AR experience may require the use of extensive computing resources, network resources, and/or the like. However, the user device and/or the network may not have a requisite capability for such extensive computing resources, network resources, and/or the like and, accordingly, may not be capable of delivering and/or executing the AR experience.

In some instances, computing resources, network resources, and/or the like of the user device and the network may by wasted by attempting (unsuccessfully) to launch the AR experience using the user device. A customer may spend an undesirable amount of time waiting to interact with a sales representative, determining an availability of the products and/or services, locating the products at the store, and/or the like. Accordingly, the lack of capability to deliver and/or execute the AR experience may negatively affect the customer experience at the store.

According to some implementations described herein, a device (e.g., a user device of a user) may obtain, via a short range wireless communication connection, information associated with a short range wireless communication device (e.g., associated with a product) and may render the product information in an augmented manner on a display of the user device. For example, the user device may determine received signal strength indicators (RSSIs) of a plurality of signals (e.g., signals broadcasted using BLUETOOTH® Low-Energy (BLE)) associated with a plurality of short range wireless communication devices (e.g., associated with a plurality of products, or a product itself, located at a store, such as a brick and mortar store). Based on the RSSIs, the user device may identify the short range wireless communication device as a nearest short range wireless communication device of the plurality of short range wireless communication devices and establish a short range wireless communication connection (e.g., a BLE connection) with the short range wireless communication device. The user device may obtain, via the short range wireless communication connection, the product information and may render the product information in an augmented manner on the display of the user device (e.g., in association with an image of the product that is presented on the display).

By obtaining the product information via the short range wireless communication connection and rendering the product information on the display of the user device, computing resources (e.g., processing resources, memory resources, communication resources, and/or the like), network resources, and/or the like may be conserved. In some implementations, object detection may be performed (for the AR experience) based on BLE proximity sensing.

The product information may include a specification, a make and/or model, a physical characteristic, a physical location (e.g., at the store), a feature, and/or the like of the product. In some implementations, objects detected (for the AR experience) may be tagged and stored by the user device to enable the user device to use the objects to recreate the AR experience.

FIGS. 1A-1E are diagrams of an example implementation 100 described herein. As shown in FIGS. 1A-1E, example implementation 100 may include a user device, short range wireless communication devices (which will be referred to in relation to FIGS. 1A-1E as a beacons), an entity management platform, a transaction system, a feature data structure, and a location/navigation data structure. The user device may include a mobile device, a computer, and/or the like. A beacon may be a short range wireless communication device (e.g., a mobile device, a device that is capable of communication using a short-range wireless communication protocol). The short-range wireless communication protocol may include BLE, BLUETOOTH®, Wi-Fi, near-field communication (NFC), Z-Wave, ZigBee, Institute of Electrical and Electronics Engineers (IEEE) 802.154, and/or the like.

The beacons may be located at a location associated with an entity (e.g., a merchant that owns or operates a store, such as a brick and mortar store). The beacons may transmit information regarding products located at the store, to the user device, to provide information and content to the user device. The products may be devices, such as mobile phones, laptop computers, tablet computers, desktop computers, wearable communication devices, accessories, and/or the like. The beacons may be included in and/or associated with the products. For example, a beacon may be included in (or integrated with) a product. Alternatively, a beacon may be separate from and paired with a product. Alternatively, a beacon may be separate from and paired with a group of products.

The entity management platform may include one or more devices that facilitate a transaction associated with the products, provide (e.g., to the user device) location information associated with the products (e.g., within the store), and/or provide (e.g., to the user device) inventory information associated with the products. The location information may include information regarding physical locations of the products (e.g., within the store), navigation instructions for navigating the store from a location (e.g., within the store) to the physical locations, and/or the like. The inventory information may include information regarding an inventory associated the products such as, for example, a quantity of the products, a description of the products (e.g., color scheme (one or more colors), storage capacity, memory capacity, and/or the like), an availability of the products for purchase, and/or the like. In some implementations, the entity management platform may include the transaction system, the feature data structure, and/or the location/navigation data structure.

The transaction system may include one or more devices capable of facilitating transactions associated with the products. For example, the transaction system may include a point-of-sale (PoS) terminal, a payment terminal (e.g., a credit card terminal, a contactless payment terminal, a mobile credit card reader, a chip reader, etc.), a security access terminal, an automated teller machine (ATM) terminal, and/or the like. The transaction system may include one or more input components and/or components to facilitate obtaining information from a transaction device (e.g., the user device, a transaction card, and/or the like), to facilitate obtaining input from the user of the transaction device (e.g., a personal identification number (PIN), a signature, biometric information, and/or the like). In some implementations, the transaction system may include transaction information (e.g., pricing information associated with the products, information regarding methods of payment, and/or the like) that may be used for facilitating the transactions associated with the products.

The feature data structure may include a data structure (e.g., a database, a linked list, a table, and/or the like) that stores the inventory information associated with the products. The location/navigation data structure may include a data structure (e.g., a database, a linked list, a table, and/or the like) that stores the location information associated with the products. In some implementations, the feature data structure and the location/navigation data structure may be implemented as separate databases. Alternatively, the feature data structure and the location/navigation data structure may be implemented as a single data structure.

The user device, the beacons, the entity management platform, the transaction system, the feature data structure, and the location/navigation data structure are further described below in connection with FIGS. 2 and 3. The number and arrangement of the user device, the beacons, the entity management platform, the transaction system, the feature data structure, and the location/navigation data structure shown in FIGS. 1A-1E are provided merely as examples and, in practice, example implementation 100 may include a different number and arrangement of the endpoint devices, the network, and the network devices.

As shown in FIG. 1A, and by reference number 110, the user device may scan for signals and receive signals from the beacons. For example, upon arriving at or near the location associated with the store, the user may launch a customer experience application on the user device. Alternatively, the user may configure the user device to automatically launch the customer experience application upon the user device detecting that the user device is within a threshold distance of and/or within an area associated with the location (and/or one or more other locations that offer products and/or services for sale). The customer experience application may be launched to enable the user to conduct a transaction (e.g., make a purchase) at the store.

In this instance, for example, assume that the user device determines that the user device is located within the threshold distance of and/or the area associated with the store. As a result, the user device may automatically launch the customer experience application. The user device (e.g., via the customer experience application) may cause a wireless communication component (e.g., a short range wireless communication component) to scan for signals associated with beacons that are located at the store.

As shown in FIG. 1A, the beacons may include Beacon 1, Beacon 2, and Beacon 3. In this example, assume that Beacon 1 is associated with a computer, Beacon 2 is associated with a tablet, and Beacon 3 is associated with a smart watch. Three beacons and three products are described as being present in the store for ease of description. In practice, additional, fewer, or different types of beacons and/or products may be present in the store. For example, a single beacon may be associated with a single product (e.g., in a one-to-one pairing). Alternatively, a single beacon may be associated with a group of products (e.g., in a one-to-many pairing). Alternatively, a first beacon may be associated with a first product and a second beacon may be associated with a plurality of second products (e.g., which may be a same type of product or two or more different types of products).

The user device may receive signals from the beacons or devices. The beacons may broadcast the signals using the short-range wireless communication protocol (e.g., BLE, BLUETOOTH®, Wi-Fi, near-field communication (NFC), and/or the like). In some implementations, the beacons may broadcast the signals using BLE and, accordingly, the signals may be BLE signals. The signals may include information regarding a transmission power associated with transmitting the signals. In some implementations, the signals may further include a limited amount of information regarding the products.

For example, the signal, of a beacon, may include a product identifier (e.g., a serial number) of a corresponding product and/or a make (e.g., information identifying a manufacturer of the product) and a model of the corresponding product without including other information regarding the corresponding product such, as for example a physical characteristic (e.g., a color scheme, a shape, a size, and/or the like), a specification (e.g., a storage capacity, a memory capacity, a processing speed, display resolution, camera capability, and/or the like), a feature (e.g., battery management feature, media streaming feature, wireless communication feature, virtual assistant feature, and/or the like), and/or the like of the corresponding product. The other information may be transmitted when the user device establishes a connection (e.g., a short range wireless communication) with the beacon.

As shown in FIG. 1A, and by reference number 120, the user device may determine received signal strength indicators (RSSIs) of the signals. For example, the user device may determine the RSSIs based on the information regarding the transmission power included the signals. For instance, the user device may determine a value of the RSSI of a first signal transmitted by Beacon 1 based on the information regarding the transmission power included the first signal, determine a value of the RSSI of a second signal transmitted by Beacon 2 based on the information regarding the transmission power included the second signal, and so on.

In some embodiments, the user device may use the RSSIs to determine a physical distance between the user device and the beacons. For example, a value of the RSSI of the first signal may correlate to a distance between the user device and Beacon 1, a value of the RSSI of the second signal may correlate to a distance between the user device and Beacon 2, and so on.

Figure 1B:
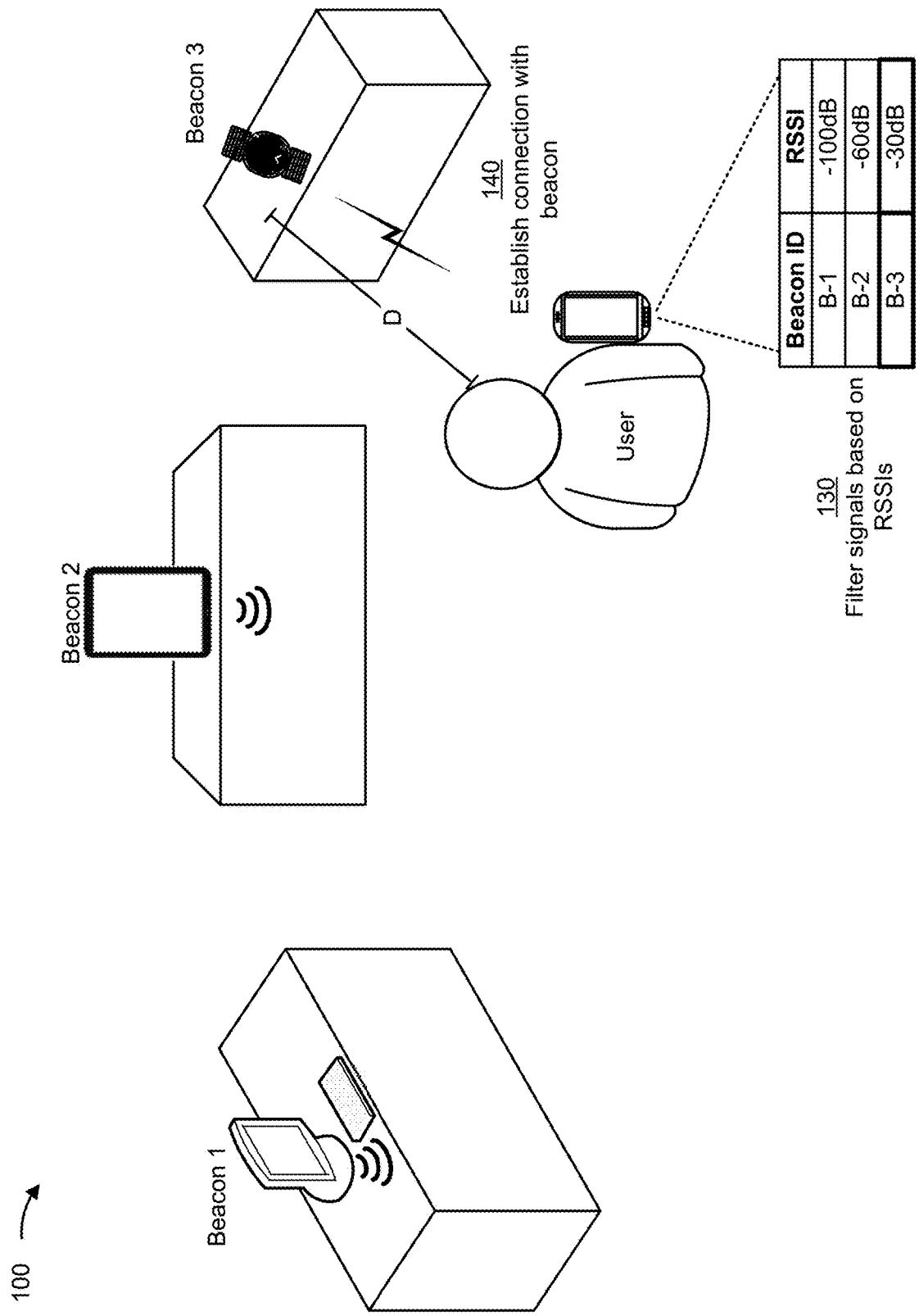

As shown in FIG. 1B, and by reference number 130, the user device may filter the signals based on the RSSIs. For example, the user device may filter the signals based on comparing a threshold RSSI value and values of the RSSIs associated with the signals. For instance, the user device may determine whether the value of the RSSI, associated with a signal, satisfies the threshold RSSI value and discard the signal when the value of the RSSI, associated with the signal, does not satisfy the threshold RSSI value.

In some implementations, the user device (e.g., using the customer experience application) may determine the threshold RSSI value based on a threshold distance between the user device and a beacon. In other words, the threshold RSSI value may be based on a value of an RSSI that indicates that a beacon is within the threshold distance of the user device. Alternatively, the threshold distance may be pre-established by the customer experience application.

Additionally, or alternatively, the user device (e.g., using the customer experience application) may dynamically determine the threshold RSSI value based on a quantity of signals received by the user device. For example, the user device may determine the threshold RSSI value based on a threshold quantity of signals. For instance, the user device may increase the threshold RSSI value as the quantity of signals (received by the user device) increases to a quantity that satisfies the threshold quantity of signals. Conversely, the user device may decrease the threshold RSSI value as the quantity of signals (received by the user device) decreases to a quantity that does not satisfy the threshold quantity of signals. Dynamically adjusting the threshold RSSI value may adjust the quantity of signals to a quantity that is manageable by the user device.

Based on comparing a threshold RSSI value and values of the RSSIs associated with the signals, the user device may identify a beacon, out of the beacons located in the store, that is nearest to the user device. The beacon may correspond to a beacon associated with a value of RSSI that satisfies the threshold RSSI value and that is highest out of the values of RSSIs associated with the beacons.

As shown in FIG. 1B, and by reference number 140, the user device may establish a connection with the beacon. The user device may establish a connection with the beacon that is nearest to the user device. For example, assume that the user device moves toward Beacon 3. Further assume that the user device and/or the user are within a distance D from Beacon 3. Further assume that the RSSI value associated with the first signal (from Beacon 1 with a Beacon ID B-1) is −100 dB, the RSSI value associated with the second signal (from Beacon 2 with a Beacon ID B-2) is −60 dB, and the RSSI value associated with the third signal (from Beacon 3 with a Beacon ID B-3) is −30 dB. Further assume that the threshold RSSI value is −30 dB.

The user device may compare the threshold RSSI value and the value of RSSI associated with the first signal, compare the threshold RSSI value and the value of RSSI associated with the second signal, and the threshold RSSI value and the value of RSSI associated with the third signal. Based on the comparisons, the user device may determine that the RSSI value associated with Beacon 3 satisfies the threshold RSSI value and is highest out of the values of RSSIs associated with Beacon 1, Beacon 2, and Beacon 3. Accordingly, the user device may determine that Beacon 3 is nearest to the user device and is within the threshold distance from the user device. In other words, distance D may satisfy the threshold distance.

Based on determining that the value of RSSI associated with Beacon 3 satisfies the threshold RSSI value and is highest out of the values of RSSIs associated with Beacon 1, Beacon 2, and Beacon 3, the user device may establish a short range wireless communication connection (e.g., Wi-Fi connection, Bluetooth connection, BLE connection, NFC connection, and/or the like) with Beacon 3. In some implementations, the short range wireless communication connection may correspond to a BLE connection.

The above threshold RSSI value and the values of RSSI are provided as examples. Other examples may differ from what is described with regard to the threshold RSSI value and RSSI values.

As shown in FIG. 1C, and by reference number 150, the user device may obtain product information via the connection. For example, the user device may obtain, from Beacon 3 and via the short range wireless communication connection, the product information of the product corresponding to Beacon 3. In some implementations, the user device may transmit, via the short range wireless communication connection, a request for the product information to Beacon 3 and may receive, via the short range wireless communication connection, the product information from Beacon 3 based on the response. The request may include the product identifier (e.g., serial number) of the product included in the signal from Beacon 3. Alternatively, the user device may receive the product information, via the short range wireless communication connection, from Beacon 3 without transmitting the request.

The product information may include information regarding a product identifier, a make, a model, physical characteristics, features, a specification, and/or the like of the product associated with the beacon. The product identifier may include a serial number, a stock keeping unit number, another unique identifier (e.g., provided by the entity), and/or the like of the product. The make may be associated with a manufacturer of the product. The model may include a model identifier of the product. The physical characteristic may include a color scheme, a shape, a size, and/or the like of the product. The features may include a battery management feature, a media streaming feature, a wireless communication feature, a virtual assistant feature, and/or the like of the product. The specification may include a storage capacity, a memory capacity, a processing speed, a display resolution, a camera capability, and/or the like of the product.

As shown in FIG. 1C, and by reference number 160, the user device may perform one or more actions associated with the product based on the product information and/or entity-based product information. In some implementations, the user device may establish a connection with the entity management platform and transmit, via the connection, a request for the entity-based product information. The request may include a product identifier (e.g., a serial number, a stock keeping unit number, an image (e.g., captured by the user device), and/or the like of the product). Based on the request, the entity management platform may obtain the entity-based product information from the transaction system, the feature data structure, and/or the location/ navigation data structure. The transaction system, the feature data structure, and/or the location/navigation data structure may store one or more portions of the entity-based product information in association with the product identifier. Accordingly, the entity management platform may obtain the entity-based product information, using the product identifier, from the transaction system, the feature data structure, and/or the location/navigation data structure.

The entity-based product information may include information regarding the product that is specific to the store and/or a group of stores associated with the entity. For example, the entity-based information may include information identifying a physical location of the product in the store, a quantity of the product, related products, transaction information of the product, and/or the like. The physical location may include an aisle, a shelf, a position on a shelf, and/or the like. The quantity of the product may include a quantity of the product in the store and/or in other stores associated with the entity. The related products may include products of a same make and model as the product but with different features, physical characteristics, and/or the like, products of a same make but a different model, products of a different make but with similar features, physical characteristics, and/or the like, products commonly purchased with the product, and/or the like. The transaction information may include pricing information, available discounts and/or promotions, method of payment, information that may enable the user to make a transaction associated with the product (e.g., make a purchase), and/or the like.

The entity management platform may obtain the information identifying the physical location of the product from the location/navigation data structure, obtain the information identifying the quantity of the product and the related products from the feature data structure, and obtain the transaction information from the transaction system. The entity management platform may aggregate the information as the entity-based product information and may provide the entity-based product information to the user device via the connection. In some implementations, the entity-based product information may include a portion of the product information.

Based on obtaining the product information and/or the entity-based product information, the user device (e.g., using the customer experience application) may perform one or more actions, as described below in connection with FIG. 1D and FIG. 1E. When performing the one or more actions, the user device may provide one or more portions of the product information and/or the entity-based product information with information (e.g., an image of the product) provided on a display of the user device to provide an AR experience relating to the product without requiring the user device to use the image processing techniques that consume a considerable amount of computing resources, network resources, and/or the like.

Figure 1D:
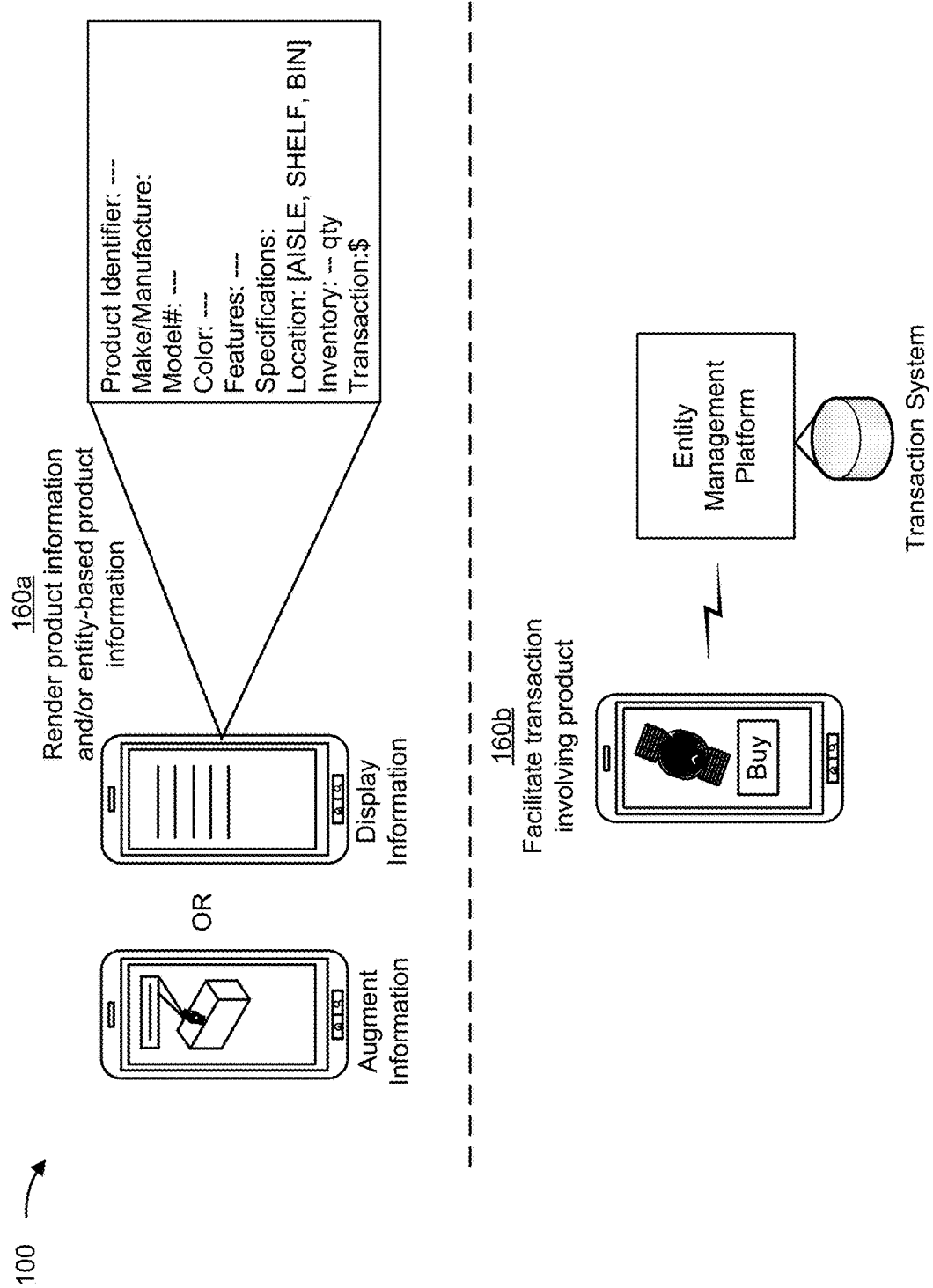

As shown in FIG. 1D, and by reference number 160a, the user device may render the product information and/or the entity-based product information. In some implementations, the user device may render the product information and/or the entity-based product information in association with an image (of the product) that is presented on the display to provide an AR experience relating to the product. For example, the user device (e.g., using the customer experience application) may launch a camera application of the user device and may overlay the product information and/or the entity-based product information on a camera view displaying an image of the product to provide the AR experience.

In some implementations, prior to overlaying the product information, the user device may determine (e.g., using one or more sensors of the user device) a physical location and/or an orientation of the user device. The user device may determine the physical location of the product based on the entity-based product information. The user device may determine a spatial relationship between the user device and the product based on the physical location of the product and the physical location and/or the orientation of the user device. The user device may render the product information and/or the entity-based product information on the display of the device based on the spatial relationship. In some implementations, the user device may render the product information and/or the entity-based product information on the display of the device without the image of the product.

As shown in FIG. 1D, and by reference number 160b, the user device may facilitate a transaction involving the product. For example, the user device may render the transaction information on the display of the user device. The user device may obtain the transaction information from the entity management platform in a manner similar to the manner described above in connection with FIG. 1C (reference number 160). In some implementations, the transaction information may include a selectable item that enables the user to purchase the product.

Additionally, or alternatively, the transaction information may include promotions and/or discounts regarding the product. The promotions may be personalized for the user of the user device (e.g., personalized based on purchase history of the user, browsing history of the user, services subscribed to by the user, and/or the like). Additionally, or alternatively, the transaction information may include a comparison between pricing information of the entity and pricing information of another entity (e.g., a competitor of the entity). For example, the transaction information may include pricing information for the product and/or services associated with the product and pricing information for a similar product offered by the other entity and/or services associated with the similar product.

Additionally, or alternatively, the transaction information may include a virtual assistant to assist the user during the transaction process. The user may interact with the virtual assistant using vocal and/or textual queries (and/or commands). Additionally, or alternatively, the transaction information may include information regarding products, of the entity, that the user has considered in the store and/or online (e.g., a web site of the entity). The information may enable the user to compare pricing, capability, features, customer ratings, and/or the like of the products. In some implementations, the transaction information may be rendered in association with an image (of the product) that is presented on the display to provide an AR experience relating to the product, in a manner similar to the manner described above in connection with FIG. 1D (reference number 160a).

By providing the transaction information that enables the user to purchase the product using the user device in the store, the user device may provide an online experience for the user in an offline environment (e.g., a brick and mortar store). For example, the user may purchase the product in the store without interacting with a sales representative or a PoS terminal at the store. Accordingly, providing the transaction information that enables the user to purchase the product using the user device in the store may enhance the customer experience at the store. Additionally, providing the transaction information that enables the user to purchase the product using the user device in the store may conserve computing resources, network resources, and/or the like that would have been used to locate the product, scan the product, process payment for the product, and/or process receipt of the payment.

Figure 1E:
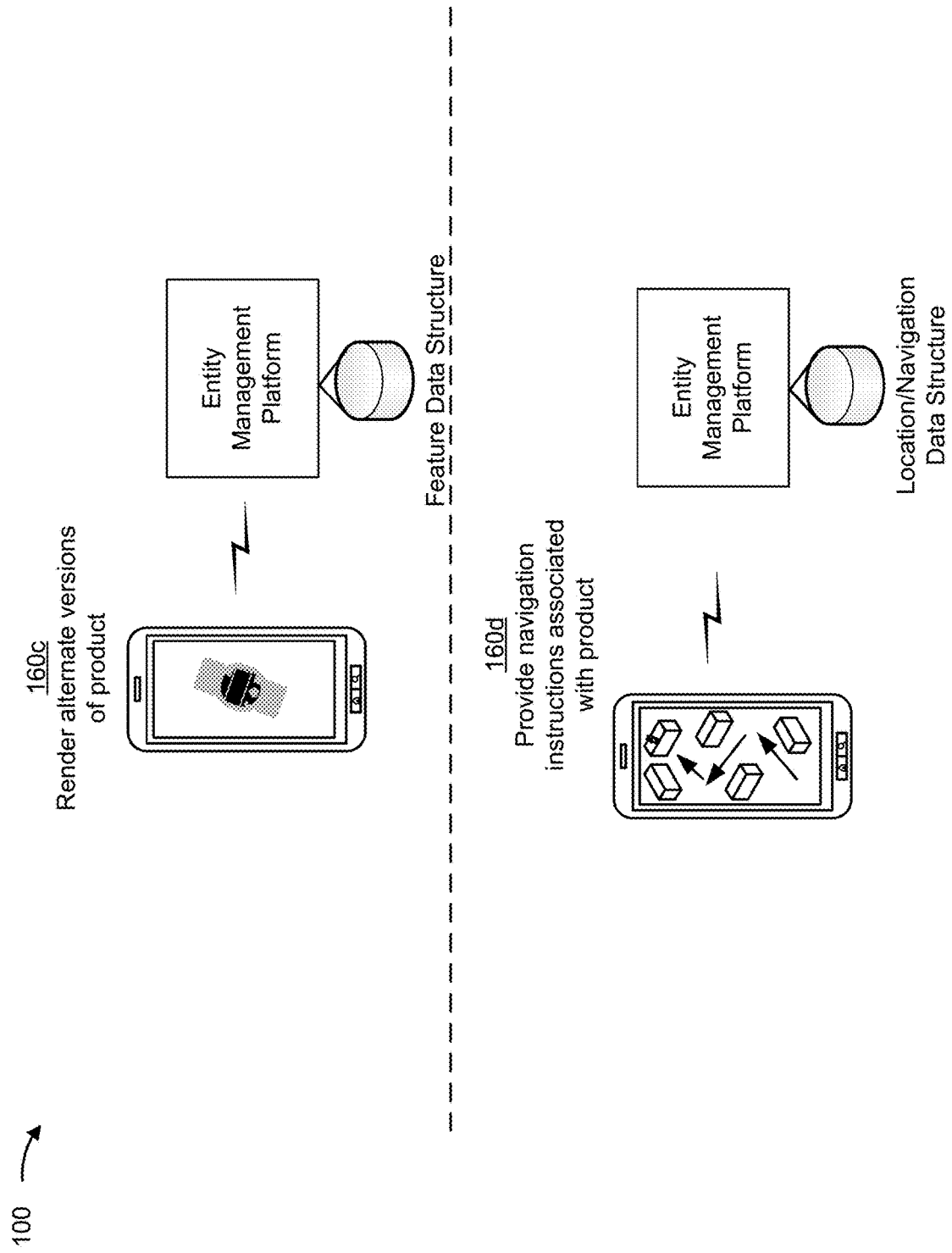

As shown in FIG. 1E, and by reference number 160c, the user device may render alternative versions of the product on the display of the device. For example, the user device may render the information identifying the related products on the display of the user device. The user device may obtain the information identifying the related products from the entity management platform in a manner similar to the manner described above in connection with FIG. 1C (reference number 160). The related products may include the alternate versions. As an example, the alternate products may include a different color scheme, a different shape, a different size, and/or the like of the product. Additionally, or alternatively, the user device may render, on the display of the device, graphical element that may enable the user to determine (e.g., measure) dimensions of the product. Additionally, or alternatively, the user device may render, on the display of the device, customer reviews regarding the product and the related products. Additionally, or alternatively, the user device may render, on the display of the device, information (e.g., a video) regarding installation, configuration, and use of the product. In some implementations, the transaction information may include a selectable item that enables the user to purchase the product.

As shown in FIG. 1E, and by reference number 160d, the user device may provide navigation instructions associated with the product. For example, the user device may render the information identifying the related products on the display of the user device. The user device may obtain the information identifying the physical location of the product from the entity management platform in a manner similar to the manner described above in connection with FIG. 1C (reference number 160). The information identifying the physical location may include the navigation instructions. The navigation instructions may enable the user to navigate the store from the physical location of the user device to the physical location of the product. The user device may render the navigation instructions in association with a view, on the display, of a location of the user device in the store. In some implementations, the navigation instructions may be rendered in association with an image (of the product) that is presented on the display to provide an AR experience relating to the product, in a manner similar to the manner described above in connection with FIG. 1D (reference number 160a).

In some implementations, the signals from the beacons may trigger the AR experience described above in connection with FIG. 1D and FIG. 1E. For example, based on detecting the signals from the beacons, the user device may perform the one or more actions described above in connection with FIG. 1D and FIG. 1E, without establishing a connection with the beacons. The user device may obtain the entity-based product information from one or more data structures associated with the user device (e.g., a storage component of the user device, feature data structure, location/navigation data structure, and/or the like). For example, based on detecting the signals from the beacons, the user device may establish a connection with the entity management platform and obtain the entity-based product information from the entity management platform in a manner similar to the manner described above.

Implementations described herein enable a user device to obtain product information (of a product) via a short range wireless communication connection and render the product information on a display of the user device. Accordingly, the implementations described herein enable the user device to provide an AR experience without image processing techniques that consume an extensive amount of computing resources (e.g., processing resources, memory resources, communication resources, and/or the like), network resources, and/or the like.

Additionally, rendering the product information on the display of the device may enable the user to minimize the amount of time spent at the store (e.g., an amount of time spent waiting to interact with a sales representative, an amount of time spent searching for a specification, a make and a model, a physical characteristic, and/or the like of the product, an amount of time spent searching for a location and/or availability of the product in the store, and/or the like). Therefore, rendering the product information may enhance the customer experience (e.g., at the store).

As indicated above, FIGS. 1A-1E are provided as examples. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
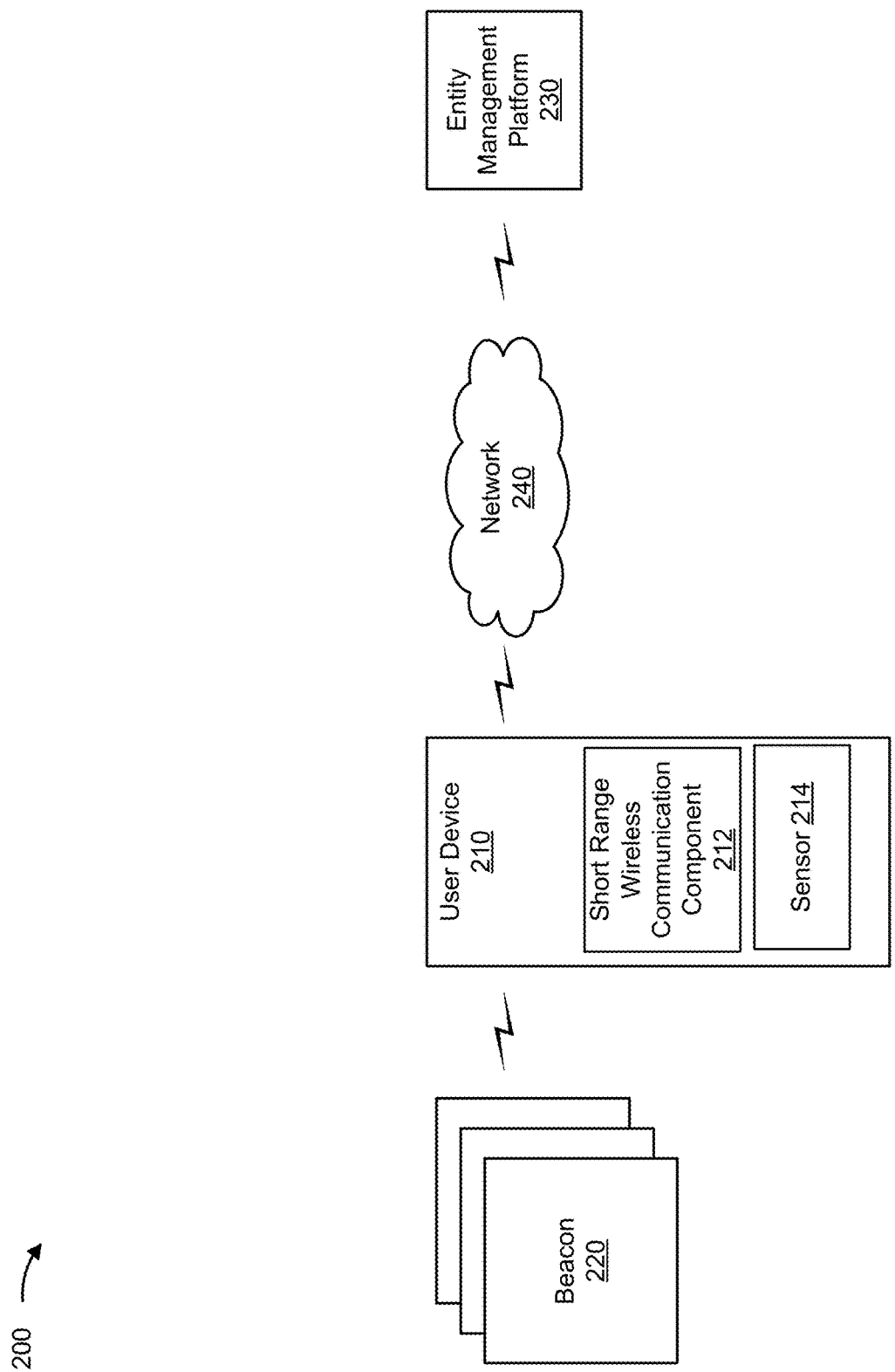
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, beacons 220 (collectively referred to as "beacons 220" and individually referred to as "beacon 220"), an entity management platform 230, and a network 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device.

User device 210 may include short range wireless communication component 212 and one or more sensors 214. Short range wireless communication component 212 includes a transceiver, a separate transmitter and receiver, an antenna, and/or the like. For example, short range wireless communication component 212 may include a Bluetooth transceiver or another type of wireless local area network transceiver. In some implementations, short range wireless communication component 212 may scan for and obtain signals from beacons 220. Sensor 214 may include one or more devices capable of sensing information (e.g., a global positioning system (GPS) component, an accelerometer, a gyroscope, and/or an actuator).

Beacon 220 includes one or more devices capable of receiving, generating, storing, processing, and/or providing information, such as information described herein, and capable of transmitting and receiving information using a short-range wireless communication protocol (e.g., BLE, BLUETOOTH®, Wi-Fi, NFC, and/or the like). For example, beacon 220 may include a communication and/or computing device, such as a wireless transceiver, a wireless transmitter, a wireless communication device, or a similar type of device.

Entity management platform 230 includes one or more devices capable of receiving, generating, storing, processing, and/or providing information, such as information described herein. Examples of entity management platform 230 may include a server device, a group of server devices, a cloud computing device, and/or the like.

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
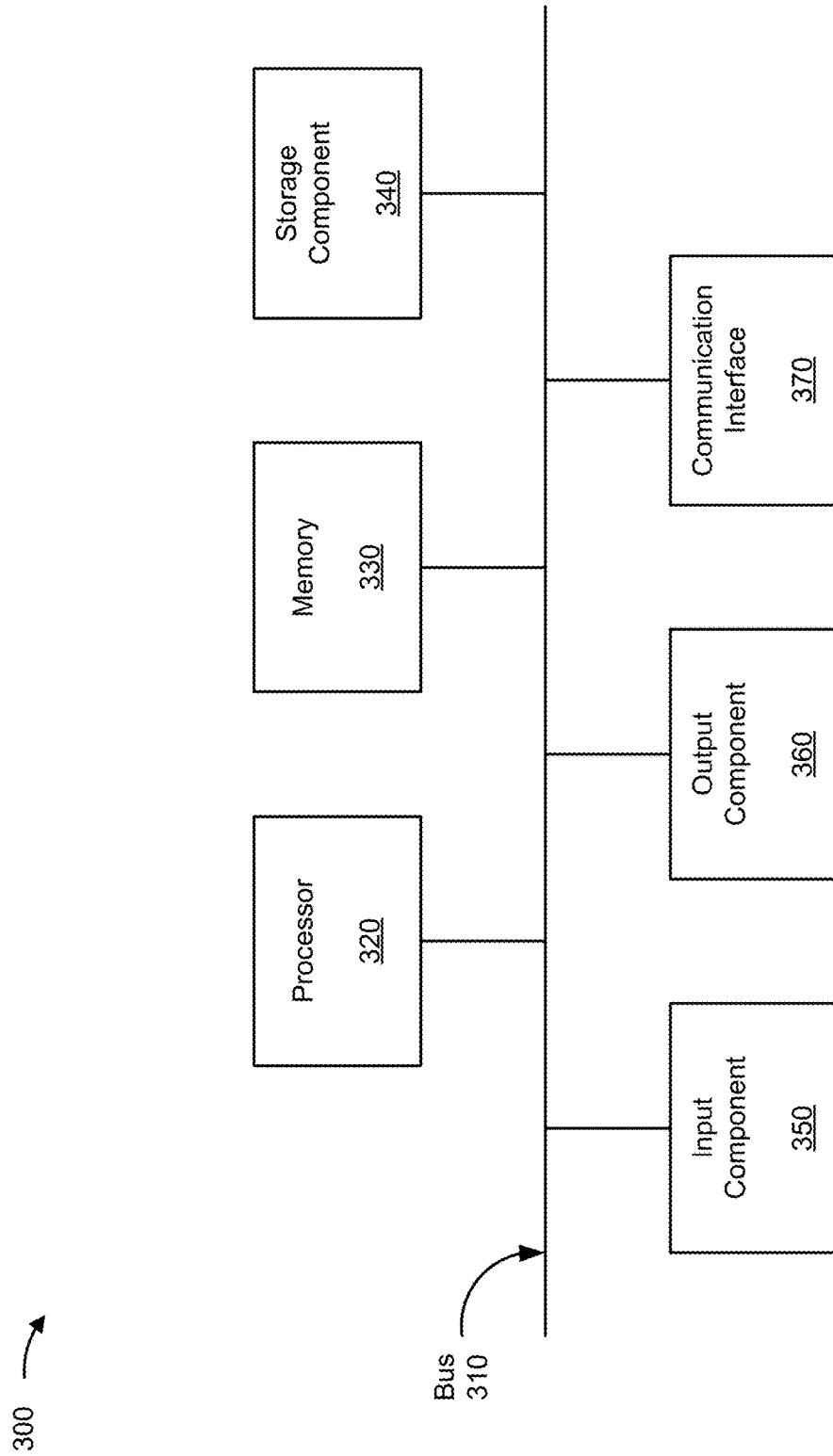
FIG. 3 is a diagram of example components of one or more devices of FIG. 2.

FIG. 3 is a diagram of example components of a device 300, which may correspond to user device 210, beacon 220, and/or entity management platform 230. In some implementations, user device 210, beacon 220, and/or entity management platform 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
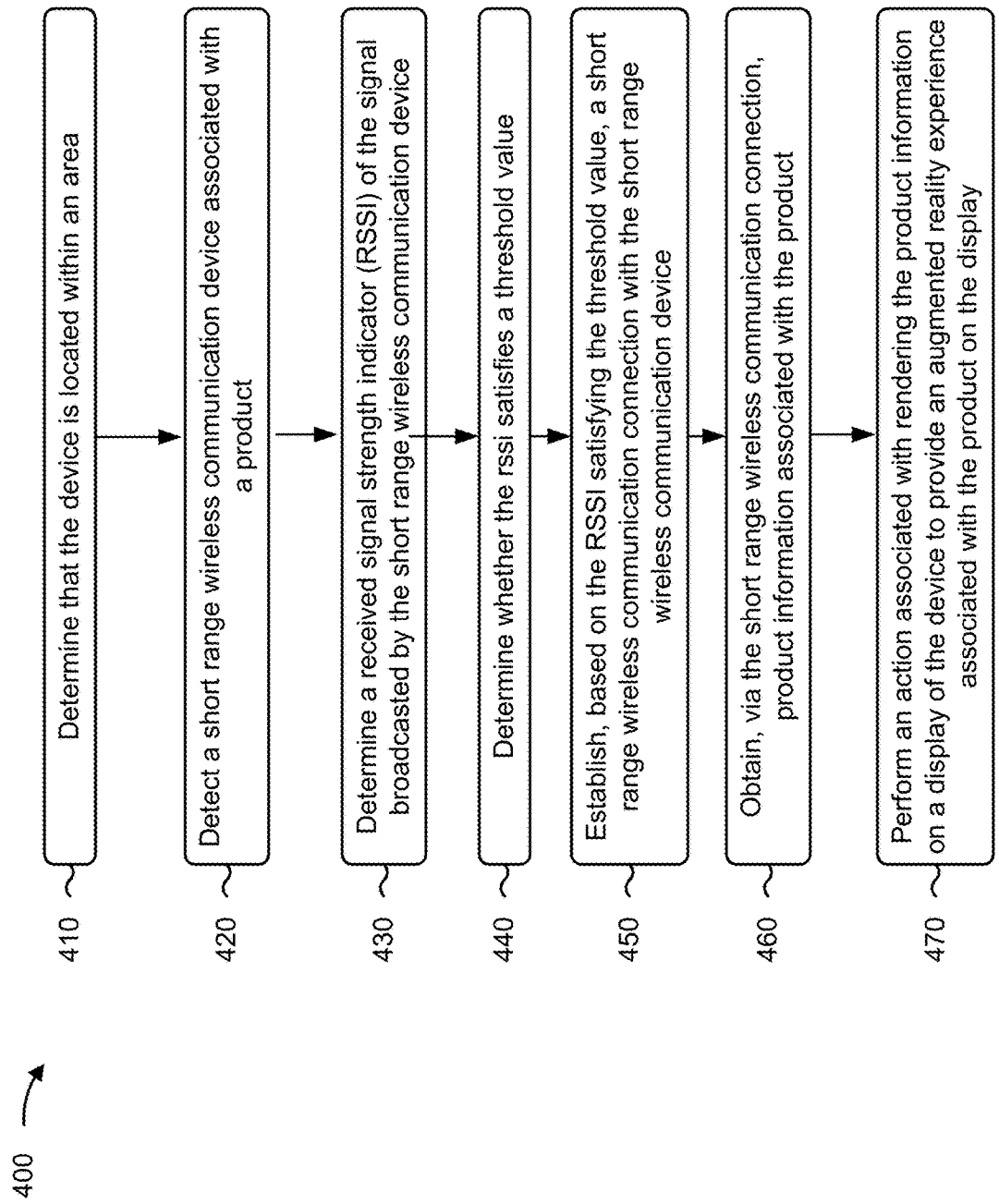
FIG. 4 is a flow chart of an example process relating to obtaining information associated with a device using short range wireless communication.

FIG. 4 is a flow chart of an example process 400 relating to obtaining information associated with a device using short range wireless communication. In some implementations, one or more process blocks of FIG. 4 may be performed by a device (e.g., user device 210). In some implementations, one or more process blocks of FIG. 4 may be performed by another device or a group of devices separate from or including the device, such as a beacon (beacon 220), an entity management platform (e.g., entity management platform 230), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include determining that the device is located within an area associated with an entity location associated with an entity (block 410). For example, the device may determine that the device is located within an area associated with an entity location associated with an entity, as described above.

As further shown in FIG. 4, process 400 may include detecting, based on determining that the device is located within the area, a short range wireless communication device that is associated with the entity based on receiving an signal from the short range wireless communication device, the short range wireless communication device being associated with a product (block 420). For example, the device may detect, based on determining that the device is located within the area, a short range wireless communication device that is associated with the entity based on receiving an signal from the short range wireless communication device, as described above. In some implementations, process 400 includes, prior to receiving the signal, configuring a short range wireless communication component of the device to scan for signals, wherein the signal is being received based on the short range wireless communication component of the device being configured to scan for signals.

As further shown in FIG. 4, process 400 may include determining a received signal strength indicator (RSSI) of the signal (block 430). For example, the device may determine a received signal strength indicator (RSSI) of the signal, as described above.

As further shown in FIG. 4, process 400 may include determining whether the RSSI satisfies a threshold value (block 440). For example, the device may determine whether the RSSI satisfies a threshold value, as described above. In some implementations, the threshold value is associated with an RSSI value that indicates that the short range wireless communication device is within a threshold distance of the device. In some implementations, process 400 includes determining the threshold value based on a quantity of signals that are received in association with the signal.

As further shown in FIG. 4, process 400 may include establishing, based on the RSSI satisfying the threshold value, a short range wireless communication connection with the short range wireless communication device (block 450). For example, the device may establish, based on the RSSI satisfying the threshold value, a short range wireless communication connection with the short range wireless communication device, as described above. In some implementations, the signal is broadcasted using BLUETOOTH® Low-Energy (BLE) and the short range wireless communication corresponds to a BLE connection.

As further shown in FIG. 4, process 400 may include obtaining, via the short range wireless communication connection, product information associated with the product (block 460). For example, the device may obtain, via the short range wireless communication connection, product information associated with the product, as described above. In some implementations, the product information at least one of a make associated with the product, a model associated with the product, a physical characteristic of the product, a feature of the product, or a specification of the product.

As further shown in FIG. 4, process 400 may include perform an action associated with rendering the product information on a display of the device to provide an augmented reality experience associated with the product. (block 470). For example, the device may perform an action associated with rendering the product information on a display of the device to provide an augmented reality experience associated with the product, the product information being rendered on the display in association with an image of the product that is presented on the display, as described above.

In some implementations, process 400 includes, determining, using a sensor of the device, a physical position of the device; obtain location information that identifies a physical location of the product; and determine a spatial relationship between the device and the short range wireless communication device based on the physical position of the device and the physical location of the product, wherein performing the action includes rendering the product information on the display of the device according to the spatial relationship.

In some implementations, the signal is a first signal and the RSSI is a first RSSI. In some implementations, process 400 includes receiving a second signal associated with a third device; determining a second RSSI of the second signal, and setting the RSSI of the second signal as the threshold value, the first RSSI is determined to satisfy the threshold value based on the first RSSI being greater than the second RSSI. In some implementations, the threshold value is associated with an RSSI value that indicates that the short range wireless communication device is within a threshold distance of the device.

In some implementations, process 400 includes setting the threshold value based on a quantity of signals that are received in association with the signal; and determining whether the RSSI satisfies the threshold value based on setting the threshold value. In some implementations, process 400 includes rendering the product information in association with an image of the product that is presented on the display.

In some implementations, process 400 includes, as part of performing the action, identifying, from the product information, a product identifier associated with the product; accessing, using the product identifier, transaction information associated with the product; and rendering, via the display, the transaction information to permit a transaction to be executed via the device, wherein the transaction involves the entity and a user of the device.

In some implementations, process 400 includes, as part of performing the action, identifying, from the product information, a product identifier associated with the product; accessing, using the product identifier, an inventory data structure associated with the entity that identifies inventory information associated with the product; and rendering the inventory information on the display.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
    one or more processors configured to:
    cause a short range wireless communication component to scan for a threshold signal;
    receive a plurality of threshold signals associated with a plurality of short range wireless communication devices,
    the plurality of short range wireless communication devices being associated with a plurality of products;
    determine received signal strength indicators (RSSIs) of the plurality of threshold signals;
    identify, based on the RSSIs, a short range wireless communication device, of the plurality of short range wireless communication devices, that is nearest the device;
    establish a short range wireless communication connection with the short range wireless communication device,
    the short range wireless communication device being associated with a product;
    obtain, via the short range wireless communication connection, product information associated with the product; and
    perform an action associated with rendering the product information on a display of the device to provide an augmented reality experience associated with the product.

2. The device of claim 1,
    wherein the one or more processors, when identifying the short range wireless communication device, are configured to:
    determine that a first RSSI of the RSSIs is greater than a second RSSI of the RSSIs,
    wherein the first RSSI is associated with the short range wireless communication device; and
    determine that the short range wireless communication is nearest the device based on the first RSSI being greater than the second RSSI.

3. The device of claim 1, wherein the one or more processors are further configured to:
    determine, prior to establishing the short range wireless communication connection, whether an RSSI, of the RSSIs, associated with a threshold signal received from the short range wireless communication satisfies a threshold value; and
    establish the short range wireless communication connection based on determining that the RSSI satisfies the threshold value.

4. The device of claim 1, wherein the one or more processors are further configured to:
    determine, using a sensor of the device, a physical location of the device;
    obtain location information that identifies a physical location of the product; and
    determine a spatial relationship between the device and the short range wireless communication device based on the physical location of the device and the physical location of the product; and wherein the one or more processors, when performing the action, are configured to:
render the product information on the display of the device according to the spatial relationship.

5. The device of claim 1, wherein the one or more processors, when performing the action, are configured to:
render the product information in association with an image of the product that is presented on the display.

6. The device of claim 1, wherein the plurality of threshold signals are broadcasted using BLUETOOTH® Low-Energy (BLE) and the short range wireless communication corresponds to a BLE connection.

7. The device of claim 1, wherein the product information includes information that identifies at least one of:
a manufacturer associated with the product,
a model associated with the product,
a physical characteristic of the product,
a feature of the product, or
a specification of the product.

8. A non-transitory computer-readable medium storing instructions, the instructions comprising:
one or more instructions that, when executed by one or more processors of a device, cause the device to:
determine that the device is located within an area;
detect, based on determining that the device is located within the area, a short range wireless communication device based on receiving a signal from the short range wireless communication device,
the short range wireless communication device being associated with a product;
determine a received signal strength indicator (RSSI) of the signal;
determine whether the RSSI satisfies a threshold value;
establish, based on the RSSI satisfying the threshold value, a short range wireless communication connection with the short range wireless communication device;
obtain, via the short range wireless communication connection, product information associated with the product; and
perform an action associated with rendering the product information on a display of the device to provide an augmented reality experience associated with the product,
the product information being rendered on the display in association with an image of the short range wireless communication device that is presented on the display.

9. The non-transitory computer-readable medium of claim 8, wherein the one or more instructions, when executed by the one or more processors, cause the one or more processors to:
prior to receiving the signal, configure a short range wireless communication component of the device to scan for signals,
wherein the signal is received based on the short range wireless communication component of the device being configured to scan for signals.

10. The non-transitory computer-readable medium of claim 8,
wherein the threshold value is associated with an RSSI value that indicates that the short range wireless communication device is within a threshold distance of the device.

11. The non-transitory computer-readable medium of claim 8, wherein the signal is a first signal and the RSSI is a first RSSI, and
wherein the one or more instructions, when executed by the one or more processors, cause the one or more processors to:
receive a second signal associated with a third device;
determine a second RSSI of the second signal; and
set the second RSSI as the threshold value,
wherein the first RSSI is determined to satisfy the threshold value based on the first RSSI being greater than the second RSSI.

12. The non-transitory computer-readable medium of claim 8,
wherein the one or more instructions, that cause the one or more processors to determine whether the RSSI satisfies the threshold value, cause the one or more processors to:
determine the threshold value based on a quantity of signals that are received in association with the signal.

13. The non-transitory computer-readable medium of claim 8,
wherein the one or more instructions, that cause the one or more processors to perform the action, cause the one or more processors to:
render the product information in association with an image of the product that is presented on the display.

14. A method, comprising:
determining, by a device, that the device is within a threshold distance of a location;
configuring, by the device, a short range wireless communication component to scan for signals associated with short range wireless communication devices that is associated with a location;
receiving, by the device, a signal associated with a short range wireless communication device of the short range wireless communication devices;
determining, by the device, a received signal strength indicator (RSSI) of the signal;
determining, by the device, whether the RSSI satisfies a threshold value;
establishing, by the device and based on the RSSI satisfying the threshold value, a short range wireless communication connection with the short range wireless communication device;
obtaining, by the device and via the short range wireless communication connection, product information associated with a product associated with the short range wireless communication device; and
performing, by the device, an action associated with rendering the product information on a display of the device with an image of the product to provide an augmented reality experience associated with the short range wireless communication connection.

15. The method of claim 14, wherein the threshold value is associated with an RSSI value that indicates that the short range wireless communication device is within a threshold distance of the device.

16. The method of claim 14, wherein determining whether the RSSI satisfies the threshold value comprises:
setting the threshold value based on a quantity of signals that are received in association with the signal; and
determining whether the RSSI satisfies the threshold value based on setting the threshold value.

17. The method of claim 14, further comprising:
determining, using a sensor of the device, a physical location of the device;
obtaining location information that identifies a physical location of the product; and determining a spatial relationship between the device and the product based on the physical location of the device and the physical location of the product; and wherein performing the action comprises:
augmenting the product information on the display of the device according to the spatial relationship.

18. The method of claim 14, wherein the location is associated with an entity, and
wherein performing the action comprises:
identifying, from the product information, a product identifier associated with the product;
accessing, using the product identifier, transaction information associated with the product; and
rendering, via the display, the transaction information to permit a transaction to be executed via the device,
wherein the transaction involves the entity and a user of the device.

19. The method of claim 14, wherein performing the action comprises:
identifying, from the product information, a product identifier associated with the product;
accessing, using the product identifier, an inventory data structure associated with an entity that identifies inventory information associated with the product; and
rendering the inventory information on the display.

20. The method of claim 14, wherein performing the action comprises:
receiving, via the short range wireless communication connection, location information associated with a physical location of the product;
determining, based on a physical location of the device, navigation instructions associated with navigating an environment between the device and the product; and
rendering the navigation instructions via the display.

* * * * *